United States Patent [19]

West

[11] Patent Number: 5,052,271

[45] Date of Patent: Oct. 1, 1991

[54] ARMING DEVICE FOR MUNITIONS

[75] Inventor: William F. West, Sunland, Calif.

[73] Assignee: Standard Armament, Inc., Glendale, Calif.

[21] Appl. No.: 553,862

[22] Filed: Jul. 19, 1990

[51] Int. Cl.$^5$ .............................................. B64D 1/04
[52] U.S. Cl. ..................................................... 89/1.55
[58] Field of Search ........................ 89/1.55, 1.56, 1.51

[56] References Cited

U.S. PATENT DOCUMENTS

| | | | |
|---|---|---|---|
| 2,923,340 | 1/1960 | Wilkie | 89/1.55 |
| 2,992,594 | 7/1961 | Anderson et al. | 89/1.55 |
| 3,200,707 | 8/1965 | West | 89/1.55 |
| 3,998,124 | 12/1976 | Milhous et al. | 89/1.55 |
| 4,088,055 | 5/1978 | West et al. | 89/1.55 |
| 4,212,225 | 7/1980 | Correll, Sr. et al. | 89/1.55 |
| 4,520,711 | 6/1985 | Robinson | 89/1.55 |
| 4,960,032 | 10/1990 | Huetter | 89/1.51 |

Primary Examiner—David H. Brown
Attorney, Agent, or Firm—Pretty, Schroeder, Brueggemann & Clark

[57] ABSTRACT

An arming device and a related method of operation are provided which selectively allow a munition to be discharged in a safe or an armed condition upon interaction with release and arming wires connected to the munition. The device includes a housing within which a munition discharge control assembly is contained that senses the discharge of the munition and then selectively ejects the arming wire from the arming device and releases the release wire from the arming device. The discharge control assembly includes release and arming mechanisms, which are rotatably disposed within the housing, and a release and arming control sub-assembly that selectively regulates the respective rotations of the release and arming mechanisms and the arming of the munition. The release mechanism retains the release wire, while the arming mechanism retains the arming wire. When the munition is to be discharged in a safe condition, the release and arming control assembly permits the release mechanism to release the release wire and eject the arming wire. On the other hand, when the munition is to be discharged in an armed condition, the release and arming control sub-assembly causes the arming mechanism to retain the arming wire while allowing the release mechanism to release the release wire.

22 Claims, 4 Drawing Sheets

ARMING DEVICE FOR MUNITIONS

BACKGROUND OF THE INVENTION

This invention relates generally to arming devices for munitions and, more particularly, to arming devices and related methods of operation which selectively permit a munition to the jettisoned or otherwise discharged bomb in a safe condition or in an armed condition.

A variety of military aircraft carry bombs or other related munitions which are mounted to bomb racks that are attached to the aircraft. It is normally a requirement that the crew aboard the aircraft be able to reliably control the instances in which the bombs are discharged from their corresponding bomb racks in an armed condition, as opposed to being discharged in a safe condition in which the bombs will not detonate. As is well-known, unintentional armed discharges of bombs from aircraft can pose a significant danger to the lives of non-combatants and allied combatants. Conversely, unintentional safe discharges can thwart essential military objectives. Consequently, it is highly desirable and typically necessary to have special arming devices connected to the bombs.

As is conventional, a separate arming device is connected to each bomb by a single wire that is ordinarily attached to the fuse of the bomb. The wire itself is then played out by the bomb as the bomb is jettisoned or otherwise discharged. In the case of a safe discharge, the arming device releases the wire once the wire has exerted a predetermined amount of pulling force on the arming device. However, for an armed discharge, the arming device retains the wire as the bomb is discharged and the resultant force acting on the fuse arms the bomb. According to a number of currently effective military specifications, for a safe discharge an arming device should release the wire at a threshold pulling force of ten to twelve pounds. These specifications also provide that the fuse should not be activated until it experiences a threshold activation force of a certain predetermined magnitude (typically, about thirty pounds) greater than the aforementioned threshold pulling force. Further, the arming device should be able to selectively hold the wire against a force of at least 150 pounds or even substantially higher. For example, in certain cases, the device may have to hold the arming wire against a combined static and dynamic force of at least 1,500 pounds.

A variety of arming devices which release the wire in response to a force which is of insufficient magnitude to arm the munition are known. By way of example, arming devices of this nature are described in my previous patents, U.S. Pat. No(s). 4,088,055 and 4,212,225. However, unwanted armed discharges of bombs have continued to occur. More particularly, from time to time, the fuse of the bomb is activated even though the force acting on the fuse is less than the threshold activation force. Moreover, in a safe discharge condition, the arming device may malfunction by retaining the wire altogether or by not releasing the wire until the pulling force exerted on the arming device has exceeded the aforementioned threshold activation force. The latter of these two situations may occur because the fluid or slip stream around the aircraft may act on the bomb in a manner that augments the pulling force on the wire beyond the threshold activation force.

It should, therefore, be appreciated that there exists a definite need for a versatile arming device which more reliably regulates the discharge of a munition in a safe as well as an armed condition and which tends to minimize malfunctioning of the arming device.

SUMMARY OF THE INVENTION

The present invention, which addresses this need, is embodied in an arming device and related method which selectively allow a bomb or other related munition to be jettisoned or otherwise discharged in a safe or an armed condition by sensing the discharge of the bomb and then selectively ejecting the arming wire from the device. As such, in the case of a safe discharge, the arming wire exerts very little, if any, pulling force on the fuse of the bomb, since the device actually tends to impart some forward momentum to the arming wire. The arming device is further standardized and versatile so that it is compatible with a wide variety of bomb racks and its simplified construction makes it less expensive to construct but more reliable. It also tends to better compensate for the aerodynamic effects of the fluid or slip stream around the aircraft which may give rise to an unwanted pulling force on the arming wire and is less affected by vertical shock loads that might otherwise cause the device to malfunction or become damaged. Further, the device is easy to manipulate, has a simplified manual release feature for ejection of the arming wire, and a safety feature to avoid improper attachment of the release and arming wires to the device.

More particularly, the arming device of the present invention includes a housing within which a munition discharge control assembly is contained that senses the discharge of the munition and then selectively ejects the arming wire from the arming device and releases the release wire from the arming device. The discharge control assembly includes release and arming mechanisms, which are rotatably disposed within the housing, and a release and arming control sub-assembly that selectively regulates the respective rotations of the release and arming mechanisms and the arming of the munition. The release mechanism retains the release wire, while the arming mechanism retains the arming wire.

When the munition is to be discharged in a safe condition, the release and arming control assembly permits the release mechanism to release the release wire and the arming mechanism to eject the arming wire. On the other hand, when the munition is to be discharged in an armed condition, the release and arming control sub-assembly causes the arming mechanism to retain the arming wire while allowing the release mechanism to release the release wire. As a preliminary matter for safety purposes, the release wire is attached to the release mechanism before the arming wire is attached to the arming mechanism.

In more detailed aspects of the invention, the release mechanism is a release cam, the arming mechanism is an arming cam, and the discharge control assembly further has a torsion spring situated between the release and arming cams. The release cam has a first release cam surface, which is engageable with the release and arming control sub-assembly, and second and third release cam surfaces which together define a release groove for receiving and retaining the release wire. The arming cam has a first arming cam surface, which is engageable with the release and arming control sub-assembly, and second and third arming cam surfaces which together define an arming groove for receiving and retaining the arming wire. The torsion spring supplies the release and arming cams with a threshold torque and thereby predisposes them to rotate in opposite directions relative to each other. The arming device is also advantageously configured so that the release mechanism can only retain the release wire, rather than the arming wire and so that the arming mechanism can only retain the arming wire but not the release wire. This provides a safety feature that safeguards against accidental attachment of the arming wire to the release cam and vice versa.

Moreover, the release and arming control sub-assembly includes a slider plate which selectively interacts with a solenoid when the munition is to be discharged in an armed condition. The slider plate and the solenoid are each disposed within the housing with the slider plate being located adjacent to the release mechanism and to the solenoid. The slider plate is further moveable within the housing between an initial position and a discharge position. The solenoid has a solenoid pin and an armature mechanism which can axially move the solenoid pin from a first position in which the pin does not prevent movement of the slider plate to a second position in which the solenoid pin moves axially within the housing and prevents movement of the slider plate. The solenoid pin is biased toward its position by a suitable biasing element. A suitable actuation mechanism, which is preferably an electrical power supply located aboard the aircraft and controlled by the aircraft crew, energizes the solenoid when the crew determines that the munition should be discharged in an armed condition.

In still more detailed aspects of the invention, the release and arming control sub-assembly includes a slider pin and a spring-loaded detent. The slider pin is attached to the slider plate and is axially disposed within the housing. It is further adapted to engage in camming action with the first arming cam surface of the arming cam as the slider plate moves within the housing. The detent is movably disposed within a substantially rectangular slot that extends vertically along the slider plate. It further can engage in camming action with the first release cam surface of the release cam and can induce movement of the slider plate upon discharge of the munition. In order to return the slider plate to its initial position, the release and arming control sub-assembly also has a resilient mechanism, such as a suitable compression spring. The compression spring is disposed within a slider bore that runs vertically within the slider plate and bears against the front wall of the housing. Moreover, the slider plate defines a solenoid bore for receiving the solenoid pin upon energization of the solenoid so that the solenoid pin prevents movement of the slider plate.

In further detailed aspects of the invention, the munitions discharge control assembly includes a mechanism for guiding the slider plate as the slider plate moves within the housing. The mechanism is disposed within the housing and is situated between the release cam and the slider plate. Moreover, the release and arming wires are specially configured so that, upon discharge of the munition, the release wire exerts force on the release mechanism before the arming wire can exert force on the arming mechanism. The arming wire also advantageously, but not necessarily, has an extender mechanism which effectively extends the length of the arming wire so that the arming wire can experience some pulling force without exerting the requisite pulling force required to arm the munition. The extender mechanism has an auxiliary wire which is connected to the munition and is slidable relative to the arming wire upon discharge of the munition.

Other features and advantages of the present invention will become more apparent from the following detailed description, taken in conjunction with the accompanying drawings, which illustrate, by way of example, the principles of the invention.

DESCRIPTION OF THE PREFERRED EMBODIMENT

Figure 1:
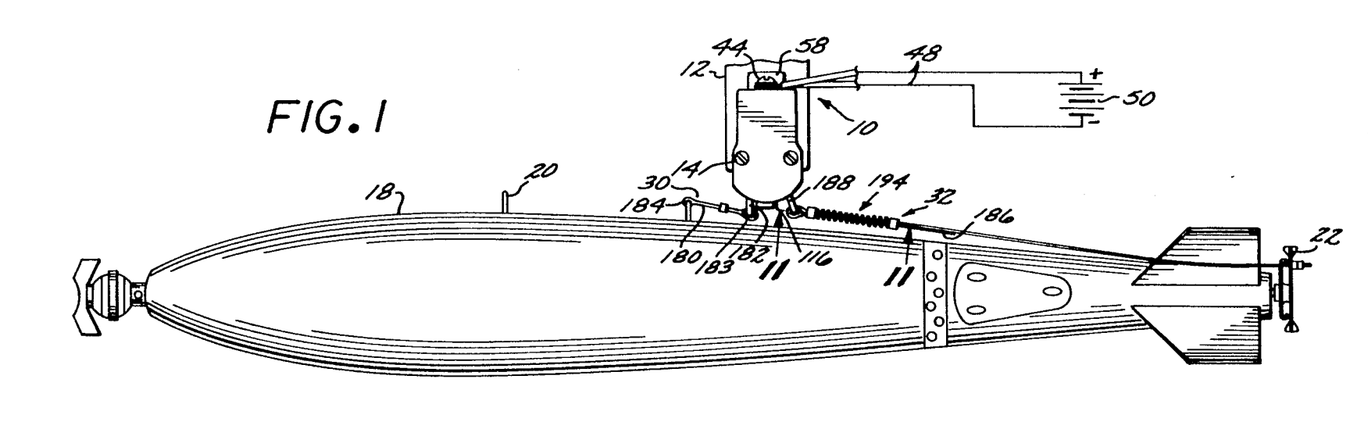
FIG. 1 is a plan view of the arming device connected to a bomb and to a bomb rack.

With reference now to the exemplary drawings, and particularly to FIG. 1, there is shown an arming device 10 which is horizontally mounted to a bomb rack 12 by fasteners 14 that extend through two parallel mounting bores 16 in the lower portion of the device. The bomb rack, which is partially depicted in FIG. 1, holds a bomb 18 or other type of munition that has a series of hooks or lugs 20 attached along its upper surface. A fuse vane 22 is connected to the rear of the bomb where the fuse is located. The fuse vane and its corresponding fuse can also be situated at the front of the bomb as well.

In accordance with the invention, the device 10 includes a housing 26 which contains a munition discharge control assembly 28 that selectively allows a bomb or other related munition to be jettisoned or otherwise discharged in a safe or an armed condition upon interaction with release and arming wire assemblies 30 and 32 connected to the bomb 18. The device senses the discharge of the bomb and then selectively ejects the arming wire assembly so that some forward momentum is actually imparted to the arming wire assembly. This results in very little, if any, pulling force being exerted on the fuse vane 22 when the bomb is discharged in a safe condition. The device is further standardized and versatile so that it is compatible with a wide variety of bomb racks 12 and its simplified construction makes it less expensive to construct but at the same time more reliable. It also tends to better compensate for the aerodynamic effects of the fluid or slip stream around the aircraft which might otherwise give rise to unwanted pulling force on the arming wire assembly 32. As a result, aerodynamic effects do not undesirably augment the pulling force on the arming wire assembly beyond the threshold activation force needed to activate the fuse. The device is less affected by vertical shock loads that might otherwise cause it to malfunction or become damaged. Further, it is easy to manipulate, has a simplified manual release feature for ejection of the release and arming wire assemblies 30 and 32, and a safety feature to avoid improper attachment of the release and arming wire assemblies.

The housing 26 is somewhat box shaped with a substantially semi-oval vertical cross-section (See FIGS. 1-5). A cover plate 34 fits over the face of the housing and thereby shields the munition discharge control assembly 10 from potentially adverse environmental affects. Two axial slots 36 and 38, which receive the release and arming wire assemblies 30 and 32 respectively, extend substantially through the bottom of the housing. The top of the housing has a pair of threaded bores 40 and 42 for receiving a separate electrical terminal 44 and 46 that are connected to electrical wires 48 which lead to a power supply 50 located within the aircraft. The electrical terminals include screws 52 with associated lock and flat washers 54 and 56, but can be made of any suitable electrical conductor. A guard plate 58 also protrudes from the housing between the electrical terminals in order to prevent cross-wiring. (See FIGS. 1 and 6). The terminals project from a suitable layer of potting material 60 that is solidified to the top of the housing. Both the face 62 of the housing and the cover plate 34 also define a series of axial bores 64 for receiving set screws 66 that secure the cover plate to the housing. An O-ring 68 or other suitable seal is also located within the housing beneath the electrical terminals.

The munition discharge control assembly 28 includes release and arming cams or wheels 70 and 72 and a release and arming control sub-assembly 74 that regulates the movement of the release and arming cams. The cams 70 and 72 are situated within a substantially cylindrical first bore 76 defined within the lower portion of the housing 26 and are rotatably disposed about a cam pin 78 that extends axially through the center of the bore 76. (See FIGS. 2 and 6). Each cam is configured in such a way that it can engage in proper camming action with the release and arming control sub-assembly and thereby discharge the bomb 18 in the desired condition.

Figure 6:
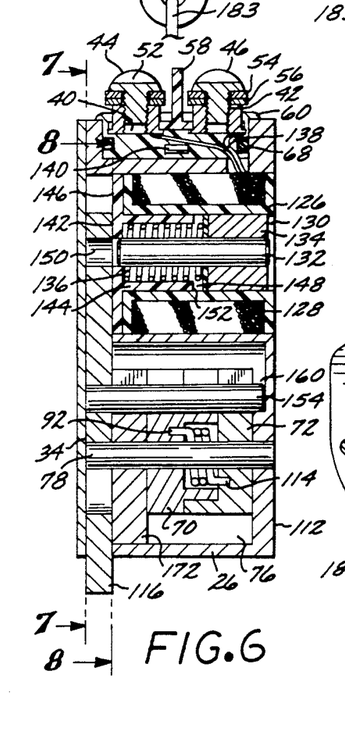
FIG. 6 is a side cross-sectional view of the arming device, taken substantially along lines 6—6 in FIG. 4.

More particularly, the release cam 70 has a substantially drum-like body 80 having a central bore 82 for receiving the cam pin 78. Three separate cam surfaces 84, 86 and 88 protrude radially from the body 80. The cam surfaces 84 and 86 define a groove 90 within which the release wire assembly 30 is retained. The cam surface 88 is adapted to engage in camming action with the release and arming control sub-assembly 74. A series of axial pinholes (one of which is shown in FIG. 6) whose purpose will become apparent below, are also defined within the inner surface of the body 80.

Like the release cam 70, the arming cam 72 has a substantially drum-like body 94 having a central bore 96 for receiving the cam pin 78. A counter-bore 98, which is concentric with the bore 96, also encircles the bore 96 and three cam surfaces 100, 102 and 104 protrude radially from the body 94. The surfaces of the counter-bore and the bore 96 together define a circular lip 106 and the bottom of the counter-bore has an axial pinhole 108, the purposes of which will become apparent below. The cam surfaces 100 and 102 together define a groove 110 within which the arming wire assembly 32 is retained, while the cam surface 104 is adapted to engage in camming action with the release and arming control sub-assembly 74. When inserted within the cylindrical bore 76 of the housing 26, the arming cam is substantially contiguous with the rear wall 112 of the housing, and the release cam sits on the arming cam. (See FIG. 6).

In order to facilitate the camming action of each cam 70 and 72 with the release and control sub-assembly 74, the munition discharge control assembly 28 has a suitable torsion spring 114 situated between the release and arming cams 70 and 72. The torsion spring sits within the counter-bore 98 of the arming cam and its two ends are received with the pinholes 92 and 108, respectively. As a result, the release and arming cams have threshold torques which predispose the cams to rotate in opposite directions about the cam pin 78. This also permits easy attachment of the release and arming wire assemblies 30 and 32 to the device.

Figure 2:
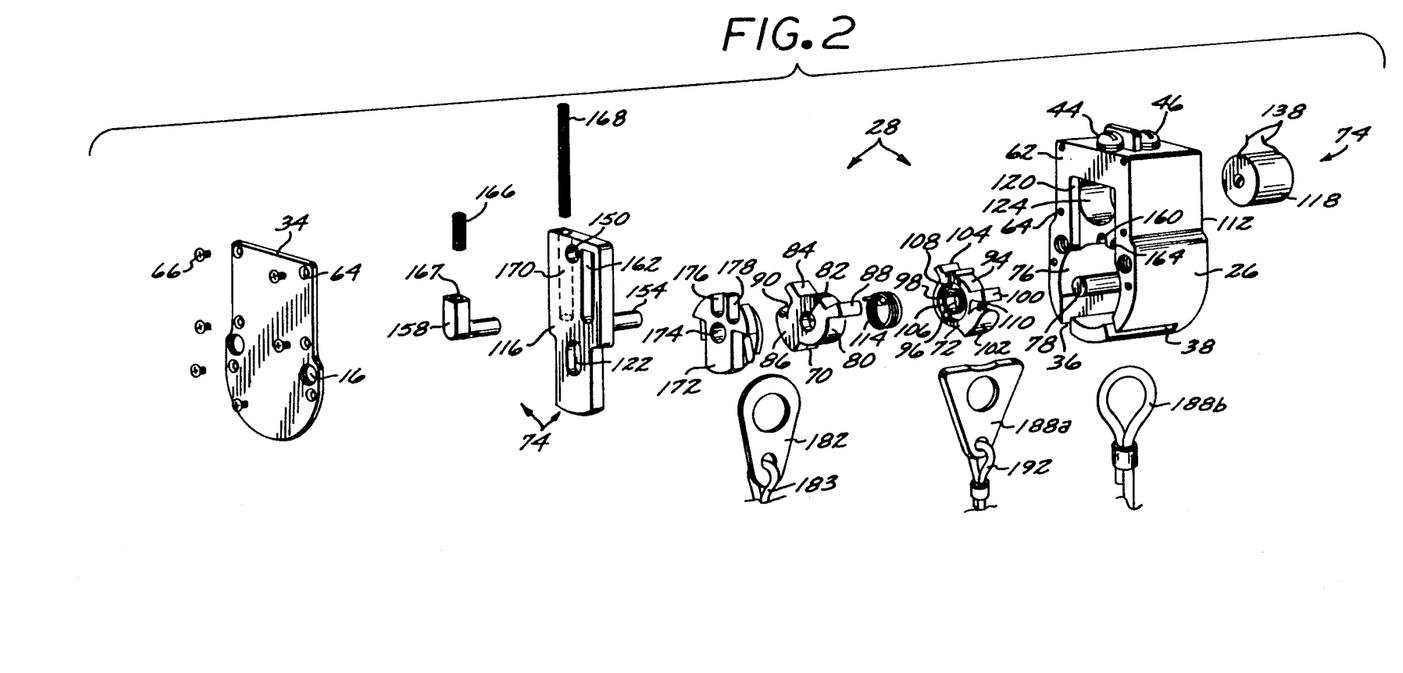
FIG. 2 is an exploded perspective view of the components of the arming device with release and arming loops.
Figure 3:
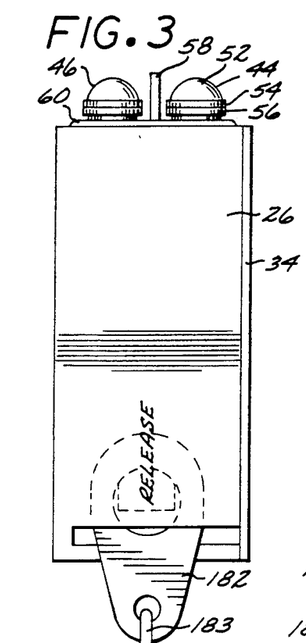
FIG. 3 is a side elevational view of the arming device shown retaining the release loop.
Figure 4:
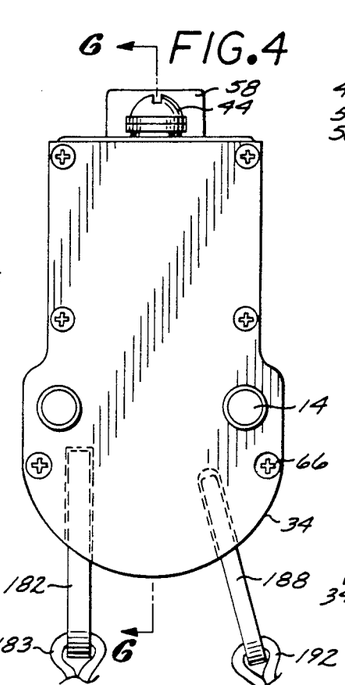
FIG. 4 is a front elevational view of the arming device shown retaining the release and arming loops and their corresponding wires.
Figure 5:
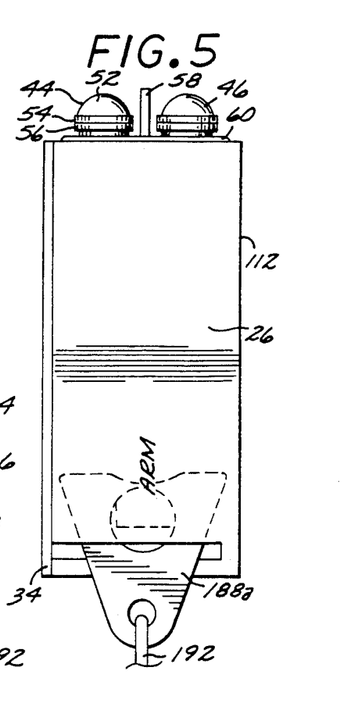
FIG. 5 is another side elevational view of the arming device shown retaining the arming loop.
Figure 7:
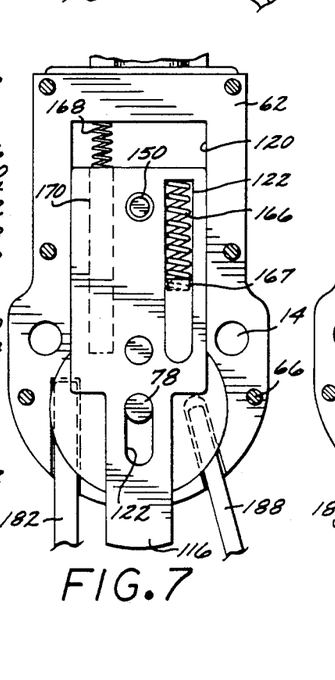
FIG. 7 is a front cross-sectional view of the arming device, taken substantially along lines 7—7 in FIG. 6.
Figure 8:
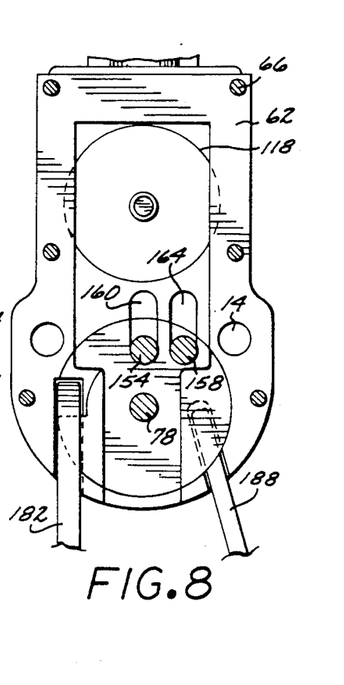
FIG. 8 is another front cross-sectional view of the arming device, taken substantially along lines 8—8 in FIG. 6.

The release and arming control sub-assembly 74 includes a slider plate 116 which selectively interacts with a solenoid 118 when the bomb 18 is to be discharged in an armed condition. As shown in FIGS. 2 and 6-7, the slider plate has a vertical cross-section which is substantially rectangular but with a necked down lower portion. It is also slidably disposed within a substantially rectangular channel 120 defined within the front wall of the housing 26. In its equilibrium or rest position (See FIGS. 6-7), the necked down portion of the slider plate sits above the release cam 70 and protrudes somewhat from the bottom of the housing 26. The necked down portion also defines an oval slider plate slot 122 which receives the cam pin 78 of the housing, and thereby stabilizes the movement of the slider plate.

As depicted in FIGS. 2 and 6, the solenoid 118 is secured within a second cylindrical bore 124 defined within the upper portion of the housing 26 so that the slider plate 116 is substantially contiguous with the solenoid. It includes a spool or bobbin 126 which has a coil or winding 128 wound around it. The bobbin defines a horizontal or axial bore 130 for receiving a solenoid pin 132 and an annular armature 134 in which the solenoid pin is securely inserted. In its equilibrium or rest position (See FIG. 6), the solenoid pin 132 extends axially from the rear wall 112 of the housing to near the slider plate. Moreover, the armature extends substantially midway through the horizontal bore 130 from the rear wall of the housing. An armature spring 136 also encircles the solenoid pin and abuts against the armature, thereby biasing the armature and solenoid pin against the rear wall of the housing.

Two lead wires 138 also connect the winding 128 of the solenoid 118 to the electrical terminals 44 and 46 so that the solenoid can be energized by the power supply 50 aboard the aircraft. A zener or other suitable diode 140 is connected between the lead wires and functions to suppress electrical transients.

The solenoid 118 further includes a bushing or pole piece 142 which has an annular projection 144 and a base 146 disposed at one end of the bobbin 126 adjacent to the slider plate 116. The annular projection extends axially within the horizontal bore 130 and surrounds a substantial portion of the armature spring 136. A relatively small gap 148 separates the armature 134 from the annular projection. It will be appreciated that the annular projection serves as a stop which limits the movement of the armature and acts as a guide for the armature spring.

When the solenoid 118 is energized by activating the power supply 50, the magnetic field generated by the winding 128 causes the armature 134 to overcome the resisting force of the armature spring 136 and move axially or horizontally away from the rear wall 112 of the housing 26. As it moves, the armature carries the solenoid pin 132 until the armature is arrested upon impact with the annular projection 144. As a result, the solenoid pin projects through a solenoid bore 150 defined in the upper portion of the slider plate 116, thereby preventing movement of the slider plate within the channel 120. Upon de-energization of the solenoid, the restoring force of the armature spring returns the armature and its associated solenoid pin to their equilibrium or rest positions (See FIG. 6). Consequently, the solenoid pin is retracted from the bore 150 and no longer prevents movement of the slider plate. As will be described more fully below, the return of the armature and solenoid pin to equilibrium is typically preceded by attachment of another release wire assembly 30 to the release cam 70.

In order to prevent residual magnetism from impeding the return of the armature 134 and solenoid pin 132 to their equilibrium positions, the solenoid 118 also has an insulator 152 which is disposed around the top of the annular projection 144. (See FIG. 6). The insulator can be a copper shim or any other suitable material. It will also be observed that the orientation of the solenoid in a horizontal or axial direction tends to reduce the adverse effects of vertical shock loads occasioned by release of other bombs that might otherwise cause premature movement of the armature or even damage the solenoid.

For the purpose of further minimizing damage to the device 10 from undesirable vertical shock loads and otherwise permitting the camming action desired for proper discharge of the bomb 18, the control sub-assembly 74, also has a slider or locking pin 154 and an elbow-shaped cam follower or detent 158. The slider pin, which is attached to the slider plate 116 and is engageable with the arming cam 72, protrudes axially from the slider plate through a substantially oval slider slot 160 defined within the housing 26. The slider slot 160 is sufficiently long so that it extends within the rear wall 112 of the housing (See FIGS. 2 and 6) and permits appropriate movement of the slider plate within the channel 120. It is further situated in the center of the slider plate near the necked down portion of the slider plate.

The detent 158, which is engageable with the release cam 70, is slidably disposed within a substantially rectangular slot 162 that extends vertically from near the top of the slider plate 116 and terminates near the necked down portion of the plate (See FIGS. 2, 6–7).

The rectangular slot 162 has a rounded bottom so that it conforms to the rounded midsection of the detent. The detent further extends axially through an oval detent slot 164 that is parallel to the slider slot 160 and is defined within the housing 26. The bottom of the detent is substantially coextensive with the bottom of the body 80 of the release cam 70 when the release cam is disposed within the first bore 76. The detent is associated with a compression or other suitable first spring 166 which is partially contained within a cavity 167 defined by the detent and abuts the upper wall of the rectangular slot 162. (See, e.g., FIGS. 2 and 7). When the detent is in its equilibrium or rest position (See FIG. 7), the spring 166 biases the detent against the rounded base of the rectangular slot. The detent, therefore, provides a threshold force which restrains the release cam from rotating.

Additionally, a second compression or other suitable spring 168 is substantially contained within a cylindrical slider bore 170 that is defined by the slider plate 116. (See FIGS. 2 and 7). The bore 170, which runs parallel to the rectangular slot 162, extends from the top of the slider plate and terminates near the necked down portion of the slider plate. The top of the spring 168 abuts against the top of the channel 120 defined within the front wall of the housing 26. As will become more apparent below, it biases the slider plate vertically downward and provides a restoring force which urges the slider plate to return to its equilibrium or rest position.

For the purpose of better guiding the slider plate 116 as it moves within the channel 120 of the housing 26, the munition discharge control assembly 28 also has a spacer 172 which is situated between the slider plate and the release cam 70. The spacer defines a bore 174 for receiving the cam pin 78 and a pair of parallel semi-oval slots 176 and 178 which are coaxial with the slider and detent slots 160 and 164, respectively. As shown in FIG. 2, the spacer is specially configured so that it will fit within the first bore 76 and at the same time provide the appropriate guiding surface for the slider plate.

As reflected in FIGS. 1-2, the release wire assembly 30 includes a wire 180 having a loop 182 and 184 attached to each end of the wire, typically by swivels 183. The loop 184 is secured to one of the lugs 20 on the bomb 18, while the loop 182 is retained by the release cam 70. (See, e.g., FIGS. 1, 3 and 9-10). The loop 182 is also preferably, but not necessarily, of a standardized configuration and thickness so that it can be easily recognized by a user of the device 10 as the loop that is to be attached to the release cam.

Figure 11:
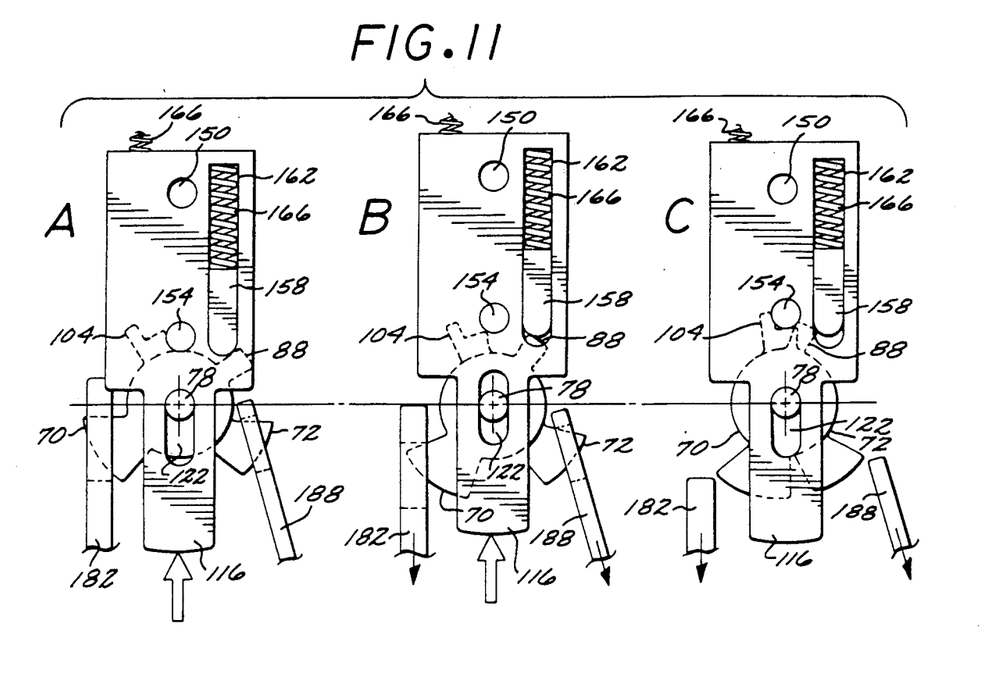
FIGS. 11A–C are front cross-sectional views of principal components of the arming device showing the progressive movements of the components for a manual release of the release and arming wires from the device.

Like the release wire assembly 30, the arming wire assembly 32 includes a wire 186 has a loop 188 attached to one end of the wire, typically by a swivel 192 (See FIG. 11). However, in this case, the wire 186 is longer than the wire 180 and the loop 188 is retained by the arming cam 72. The other end of the wire is secured to the fuse vane 22, typically via a crimping process. As will become more apparent below, the fact that the wire 186 is longer than the wire 180 permits the bomb 18 to be discharged from the bomb rack 12 in a safe condition with little, if any, pulling force being exerted on the fuse vane 22. The loop 188 is preferably, but not necessarily, of a standardized configuration and thickness which is different from the loop 182. For this purpose, the groove 90 defined by cam surfaces 84 and 86 of the release cam 70 is configured so it can only receive and retain the loop 182. Correspondingly, the groove 110 defined by the cam surfaces 100 and 102 of the arming cam 72 is specially configured to only receive and retain the loop 188. It will be understood that these configurational differences provide a safety feature that protects against accidental attachment of the arming wire assembly 32 to the releasing cam 70. Two representative loops 188a and 188b are depicted in FIG. 2. In each case, the loop 188a or 188b is thicker than the loop 182.

As an additional safety feature, the arming wire assembly 32 advantageously, but not necessarily, has an adjustable arming wire extender 194 (See FIGS. 1 and 11). The wire extender includes an auxiliary arming wire 196 has a swivel 198 attached to one of its ends. In this case, the remaining end of the wire 196, rather than the remaining end of the wire 186, is secured to the fuse vane, typically via a crimping process. In that event, the remaining end of the wire 196 also has another swivel 202. The auxiliary wire and the wire 186 are also encircled by an extender spring 204 whose opposite ends are biased against annular rings 206 and 208. Each ring has a pair of holes (not shown) through which the wire 186 and the auxiliary wire pass so that the swivels 192 and 202 of the wire 186 abut the rings respectively (See FIG. 11).

Figure 12:
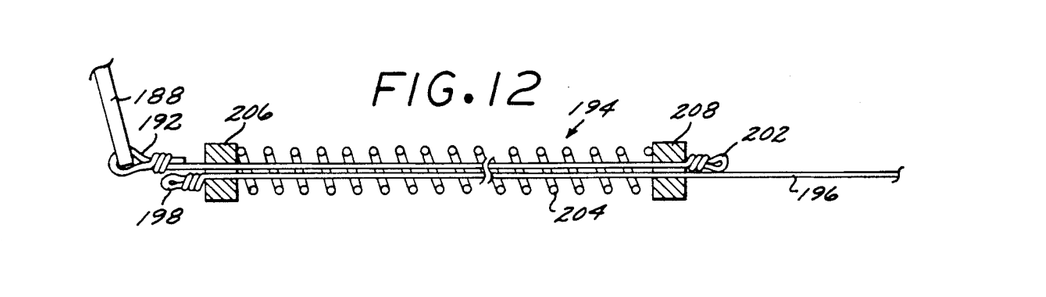
FIG. 12 is an enlarged fragmentary side view of the wire extender of the arming device connected to the arming wire assembly.
Figure 13:
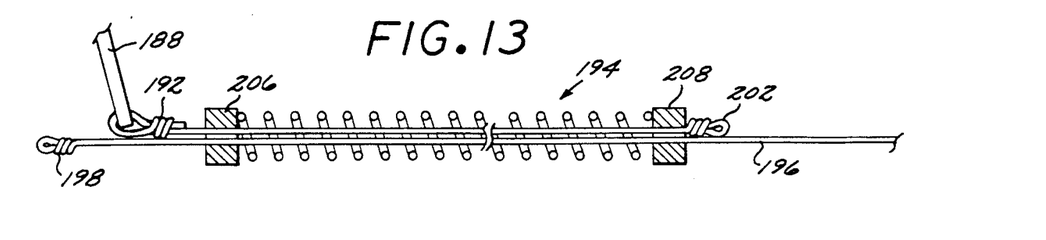
FIG. 13 is another enlarged fragmentary side view of the wire extender showing the self-adjusting feature of the arming wire assembly.

The auxiliary wire 196 can further be slid relative to the spring 204 and the wire 186 by simply manually grasping the swivel 202 and one of the rings 206 or 208 and then pulling on the swivel 202. (See FIG. 12). Consequently, it will be understood that the wire extender 194 effectively augments the length of the wire 186 so that the wire 186 can experience some pulling force without exerting the requisite pulling force on the fuse vane 22 to activate the fuse. This feature tends to compensate for the effects of the fluid or slip streams around the aircraft which may otherwise give rise to pulling forces on the wire 186. It, therefore, provides an additional safety feature against unwanted arming of the bomb 18.

Figure 9:
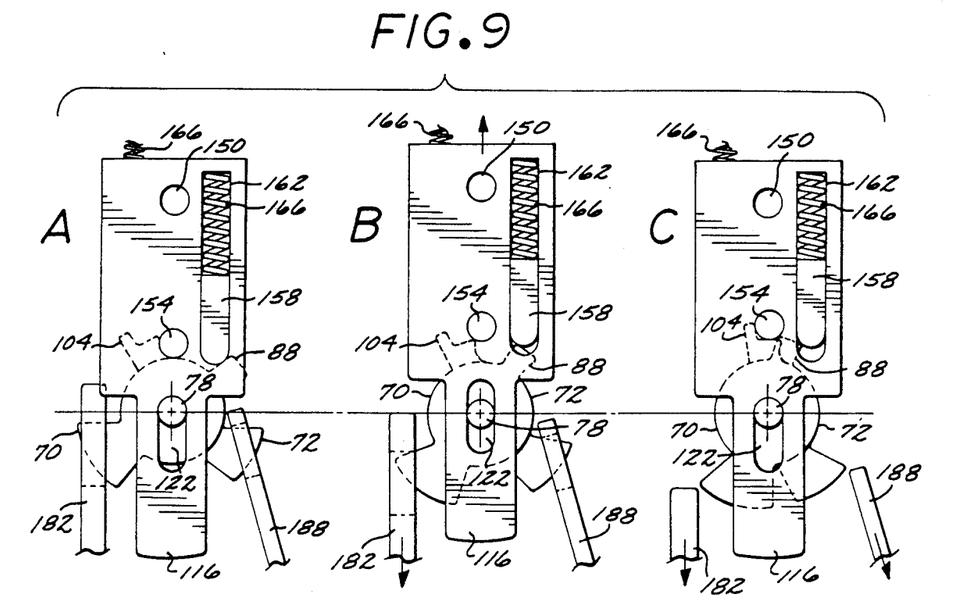
FIGS. 9A–C are front cross-sectional views of principal components of the arming device showing the progressive movements of the components when a bomb is discharged in a safe condition.
Figure 10:
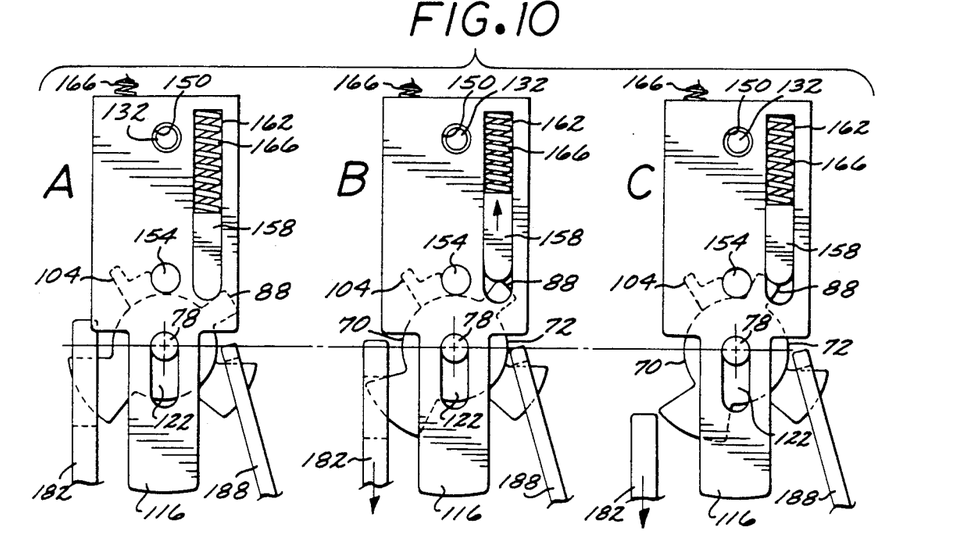
FIGS. 10A–C are front cross-sectional views of principal components of the arming device showing the progressive movements of the components when a munition is discharged in an armed condition.

The operation of the arming device 10 for discharge of the bomb 18 in both safe and armed conditions will now be discussed with particular reference to FIGS. 1 and 6-12. Preliminarily, the military user or attendant attaches the release and arming wire assemblies 30 and 32 to the device and to the bomb commencing first with attachment of the release wire assembly followed by the arming wire assembly. At this stage, the release and arming cams 70 and 72 and slider plate 116 are in the position substantially as shown in FIG. 9C. The loop 184 of the release wire assembly is attached to the appropriate lug 20 on the bomb and the loop 182 is inserted within the groove 90 defined by the release cam. As the loop 182 is inserted within the groove 90 and bears against the cam surfaces 84 and 86, the release cam rotates clockwise and the cam surface 88 of the release cam engages in camming action with the detent 158. (See broken lines in FIGS. 9C-9A successively for progressive motion of release cam). Consequently, the detent slides downward within the rectangular slot 162 and assumes its equilibrium or rest position (See FIG. 7).

Next, the user attaches the arming wire assembly 32 to the fuse vane 22 and inserts the loop 188 within the groove 110 of the arming cam 72. The arming cam, therefore, rotates counterclockwise and engages in camming action with the slider pin 154. The slider plate 116 thus moves downward within the channel 120 and assumes its equilibrium or rest position (See FIG. 7). Since the loop 188 is thicker than the loop 182 of the release wire assembly 30, it will be observed only the former can be received and retained within the groove 110 of the arming cam.

Once the release and arming wire assemblies 30 and 32 are connected to the device 10, the munition discharge control assembly 28 assumes the equilibrium or rest position together shown in FIGS. 6-8, 9A and 10A. In this position, the second spring 168 helps retain the slider plate 116 in a downward position and the detent 158 bears against the rounded base of the rectangular slot 162 (See FIG. 7) so that the release cam 70 is restrained from rotating counterclockwise. At the same, the slider pin 154 restrains the arming cam 72 from rotating clockwise and the solenoid pin 132 does not protrude through the bore 150 in the slider plate. (See, e.g., FIGS. 6, 9A and 10A).

FIG. 9 depicts the progressive movement of principal components of the device 10 for a safe discharge condition. As the bomb 18 begins to disengage from the bomb rack 12, the bomb imparts pulling force to the release wire assembly 30 that is connected to the release cam 70. Since the length of the release wire assembly is shorter than the length of the arming wire assembly 32, the release wire assembly is fully played out ahead of the arming wire assembly. The release cam, therefore, effectively senses or detects the discharge of the bomb before the arming wire assembly 32 can experience pulling force. The torsional force acting on the release cam induces the cam surface 88 of the release cam to engage in camming action with the detent 158 and thereby rotate counterclockwise. The detent then slides upwardly within its rectangular slot 162 and compresses its associated spring 166 against the upper wall of the slot 162. (See FIG. 9B). The force imparted by the detent against the slot 162 overcomes the restoring force of the second spring 168 so that the slider plate 116 moves upward within the channel 120 of the housing 26 and the second spring is compressed.

The upward movement of the slider plate 116 initiates camming action between the cam surface 104 of the arming cam 72 and the slider pin 154 so that the arming cam rotates clockwise about the cam pin 78. (See FIG. 9B). As the arming cam concludes its rotation, it ejects the arming wire assembly 32. Correspondingly, the release cam 70 releases the release wire assembly 30 as it concludes rotating (See FIG. 9C). Consequently, the release and arming wire assemblies are discharged along with the bomb 18 before the fuse vane 22 experiences any pulling force from the arming wire assembly. The bomb thus will not detonate.

When it is desired to discharge the bomb 18 from the bomb rack 12 in an armed condition, the crew aboard the aircraft first energizes the solenoid 118 by activating the power supply 50. The current then flows through the lead wires 138 through the electrical terminals 44 and 46 and induces a magnetic field in the winding 128. The magnetic field induces the armature 134 to move axially away from the rear wall of the housing 26 together with the solenoid pin 132. The solenoid pin thus protrudes through the solenoid bore 150 and prevents the slider plate 116 from moving upward within the channel 120 of the housing 26.

As the bomb 18 falls, the release wire assembly 30 experiences pulling force ahead of the arming wire assembly 32 in the manner described above. This force again induces the release cam 70 to engage in camming action with the detent 158 and to rotate counterclockwise. (See FIG. 10B). However, because the slider pin 132 of the slider plate 116 does not move, it prevents the arming cam 72 from rotating clockwise. Moreover, the release cam 70 causes the detent 158 to move upward within its slot 162 and compress the spring 166 further against the upper wall of the slot 162. In that regard, the force exerted by the detent against the upper wall of the slot cannot overcome the restraining force of the solenoid pin 132 on the slider plate 116. Consequently, the arming wire assembly continues to be retained by the arming cam.

The fuse vane 22 is pulled from the now discharged bomb 18 when the pulling force on the fuse vane exceeds the predetermined threshold activation force associated with the fuse vane. The bomb is, therefore, placed in an armed condition in which it will detonate. It will be observed that the release wire assembly 30 again falls with the bomb as in the case of a discharge of the bomb in a safe condition. (See FIG. 10C). After the bomb has properly been discharged, the power supply 50 is terminated so that the solenoid 118 is de-energized. However, the upward force of the detent 158 acting on the slider plate 116 typically prevents the solenoid pin 132 and armature 134 from returning to their equilibrium or rest positions. Therefore, in order to return the solenoid pin and armature to equilibrium, the user typically attaches another release wire assembly to the release cam 70 in the manner previously described. As a result, the detent returns to its initial position and ceases to exert upward force on the slider plate. It will be further observed that, if the wire extender 194, were employed, the onset of pulling force on the wire 186 could cause the auxiliary wire 196 to slide toward the fuse vane and relative to the extender spring 204 (See FIG. 12).

The device 10 also has a release feature which permits the release and arming wire assemblies 30 and 32 to be released by manually pushing upward on the necked down portion of the slider plate 116 that protrudes from the bottoms of the housing 26. (See FIGS. 11A-11C including solid directional arrows). When this upward force is applied, the slider plate slides upward within the channel 120 and the detent 158 moves upward. As described previously, the release cam 70 then rotates counterclockwise and the arming cam 72 rotates clockwise. The release and arming wire assemblies, therefore, are detached from the release and arming cams 70 and 72 respectively. It will be observed that the device functions substantially similarly in both a manual release mode and in a safe discharge condition.

Although the invention has been described in detail with reference to the presently preferred embodiment, it will be appreciated by those skilled in the art that various modifications can be made without departing from the spirit and scope of the invention. Accordingly, the scope of present invention is not to be limited by the particular embodiment above but is to be defined only by the claims set forth below and equivalents thereof.

I claim:

1. An arming device for selectively allowing a munition to be discharged in a safe or in an armed condition upon interaction with release and arming wires connected to the munition, comprising:
    a housing; and
    means, contained within the housing and responsive to the discharge of the munition, for sensing the discharge of the munition and then selectively ejecting the arming wire from the arming device and releasing the release wire from the arming device, including,
    (a) release means, rotatably disposed within the housing, for retaining the release wire and then releasing the release wire,
    (b) arming means, rotatably disposed within the housing, for retaining the arming wire and selectively ejecting the arming wire, and
    (c) release and arming control means, moveable within the housing and responsive to the discharge of the munition, for selectively regulating the respective rotations of the release means and the arming means and for selectively preventing the arming means from ejecting the arming wire when the munition is to be discharged in an armed condition,
    whereby, when the munition is to be discharged in a safe condition, the release means releases the release wire and the arming means ejects the arming wire and, when the munition is to be discharged in an armed condition the release means releases the release wire and the arming means retains the arming wire.

2. An arming device according to claim 1, wherein the release and arming wires are configured so that, upon discharge of the munition, the release wire exerts force on the release means before the arming wire can exert force on the arming means.

3. An arming device according to claim 1, further including means for actuating the release and arming control means.

4. An arming device according to claim 1, wherein the means for sensing further includes a torsion spring, situated between the release and arming means, for supplying the release and arming means with a threshold torque, and thereby pre-disposing the release and arming means to rotate in opposite directions relative to each other.

5. An arming device according to claim 1, further including extender means, connected to the arming wire, for effectively extending the length of the arming wire, the extender means having an auxiliary wire which is connected to the munition and is slidable relative to the arming wire upon discharge of the munition.

6. An arming device according to claim 1, wherein:
    the release means is a release cam having a first release cam surface that is engageable with the release and arming control means and second and third release cam surfaces which together define a release groove for receiving and for retaining the release wire; and
    the arming means is an arming cam having a first arming cam surface that is engageable with the release and arming control means and second and third arming cam surfaces which together define an arming groove for receiving and retaining the arming wire, the release and arming means having a common axis of rotation.

7. An arming device according to claim 6, wherein the release and arming control means includes:
    a slider plate which is disposed within the housing adjacent to the release means, the slider plate being vertically moveable within the housing between an initial position and a discharge position and further defining
    (a) a cylindrical slider bore running vertically within the plate, and
    (b) a substantially rectangular slot situated vertically along the plate and running parallel to the slider bore;

a slider pin attached to the slider plate and adapted to engage in camming action with the first arming cam surface of the arming means as the slider plate moves within the housing, the slider pin being disposed axially within the housing;

a spring-loaded detent which is moveably disposed within the rectangular slot, the detent further being engageable in camming action with the first release cam surface of the release cam and being adapted to induce movement of the slider plate upon discharge of the munition;

resilient means for restoring the slider plate to its initial position, the resilient means being disposed with the slider bore and being biasable by the housing; and a solenoid which is disposed within the housing and which, when energized, prevents movement of the slider plate.

8. An arming device according to claim 7, wherein the means for sensing further includes means for guiding the slider plate as the slider plate moves within the housing, the means for guiding being disposed within the housing and being situated between the release means and the slider plate.

9. An arming device according to claim 7, wherein the solenoid includes:

a solenoid pin which is axially moveable within the housing;

armature means for moving the solenoid pin from a first position in which the solenoid pin does not prevent movement of the slider plate to a second position in which the solenoid pin moves axially within the housing and prevents movement of the slider plate; and means, disposed around the solenoid pin, for biasing the solenoid pin toward the first position.

10. An arming device according to claim 9, wherein the slider plate defines a solenoid bore for receiving the solenoid pin upon energization of the solenoid.

11. An arming device for selectively allowing a munition to be discharged in a safe or in an armed condition upon interaction with release and arming wires connected to the munition, comprising:

a housing; and munition discharge control assembly means, contained within the housing and responsive to the discharge of the munition, for sensing the discharge of the munition and then selectively ejecting the arming wire from the arming device and releasing the release wire from the arming device, including, (a) release means, rotatably disposed within the housing, for retaining and then releasing the release wire, (b) arming means, rotatably disposed within the housing, for retaining and then selectively ejecting the arming wire, and (c) a release and arming control subassembly contained within the housing and responsive to the discharge of the munition, the sub-assembly including, (1) release control means, moveable within the housing, for regulating the rotation of the release means, (2) arming control means, moveable within the housing, for selectively regulating the rotation of the arming means, and (3) restraining means, disposed within the housing, for selectively preventing movement of the arming control means and thereby preventing the arming means from ejecting the arming wire.

12. An arming device according to claim 11, wherein the release and arming wires are configured so that, upon discharge of the munition, the release wire exerts force on the release means before the arming wire can exert force on the arming means.

13. An arming device according to claim 11, further including means for actuating the restraining means.

14. An arming device according to claim 11, wherein the discharge control assembly means further includes a torsion spring, situated between the release and arming means, for supplying the release and arming means with a threshold torque, and thereby pre-disposing the release and arming means to rotate in opposite directions relative to each other.

15. An arming device according to claim 11, further including extender means, connected to the arming wire, for effectively extending the length of the arming wire, the extender means having an auxiliary wire which is connected to the munition and is slidable relative to the arming wire upon discharge of the munition.

16. An arming device according to claim 11, wherein, when the munition is discharged in a safe condition the release means rotates sufficiently to release the release wire and the arming means rotates sufficiently to eject the arming wire, and when the munition is discharged in an armed condition the release means rotates sufficiently to release the release wire while the arming means retains the arming wire.

17. An arming device according to claim 11, wherein:

the release means is a release cam having a first release cam surface that is engageable with the release control means and second and third release cam surfaces which together define a release groove for receiving and for retaining the release wire; and the arming means is an arming cam having a first arming cam surface that is engageable with the arming control means and second and third arming cam surfaces which together define an arming groove for receiving and retaining the arming wire, the release and arming means having a common axis of rotation.

18. An arming device according to claim 17, wherein:

the arming control means includes, a slider plate which is disposed within the housing adjacent to the release means and to the restraining means, the slider plate being vertically moveable within the housing between an initial position and a discharge position and further defining (a) a cylindrical slider bore running vertically within the plate, and (b) a substantially rectangular slot situated vertically along the plate and running parallel to the slider bore, a slider pin attached to the slider plate and adapted to engage in camming action with the first arming cam surface of the arming means as the slider plate moves within the housing, the slider pin being axially disposed within the housing; and the release control means includes, (a) a spring-loaded detent which is moveably disposed within the rectangular slot, the detent further being engageable in camming action with the first release cam surface of the release cam and being adapted to induce movement of the slider plate upon discharge of the munition, and (b) resilient means for restoring the slider plate to its initial position, the resilient means being disposed with the slider bore and being biasable by the housing.

19. An arming device according to claim 15, wherein the munition discharge control assembly further includes means for guiding the slider plate as the slider plate moves within the housing, the means for guiding being disposed within the housing and being situated between the release means and the slider plate.

20. An arming device according to claim 18, wherein the restraining means is a solenoid which, when energized, prevents movement of the slider plate, the solenoid including, a solenoid pin which is axially moveable within the housing;

armature means for moving the solenoid pin from a first position in which the solenoid pin does not prevent movement of the slider plate to a second position in which the solenoid pin moves axially within the housing and prevents movement of the slider plate; and means, disposed around the solenoid pin, for biasing the solenoid pin toward the first position.

21. An arming device according to claim 20, wherein the slider plate defines a solenoid bore for receiving the solenoid pin upon energization of the solenoid.

22. A method of selectively discharging a munition from an aircraft in a safe or in an armed condition, the method comprising the steps of:

attaching a release wire to the munition;

attaching an arming wire to the munition;

attaching the release wire to an arming device connected to the aircraft, the arming device including,
(a) a housing; and
(b) means, contained within the housing and responsive to the discharge of the munition, for sensing the discharge of the munition and then selectively ejecting the arming wire from the arming device and releasing the release wire from the arming device, including,
(1) release means, rotatably disposed within the housing, for retaining the release wire and then releasing the release wire,
(2) arming means, rotatably disposed with the housing, for retaining the arming wire and selectively ejecting the arming wire, and
(3) release and arming control means, moveable within the housing and responsive to the discharge of the munition, for selectively regulating the respective rotations of the release and arming means and for selectively preventing the arming means from ejecting the arming wire when the munition is to be discharged in an armed condition, attaching the arming wire to the arming means; and selectively actuating the release and arming control means to cause the release means to release the release wire and the arming means to retain the arming wire.

* * * * *